Sept. 29, 1953     T. JAMES, JR     2,653,849
AUXILIARY BRAKE CONTROL VALVE FOR RAILROAD CARS
Filed June 11, 1949     2 Sheets-Sheet 1

INVENTOR.
THOMAS JAMES, JR.
BY
Woodcock and Phelan
ATTORNEYS

Sept. 29, 1953  T. JAMES, JR  2,653,849
AUXILIARY BRAKE CONTROL VALVE FOR RAILROAD CARS
Filed June 11, 1949  2 Sheets-Sheet 2
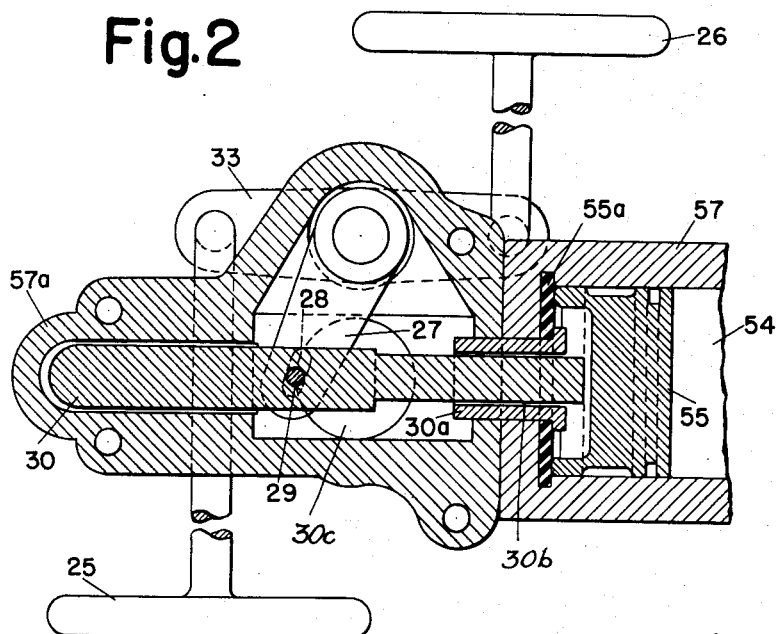
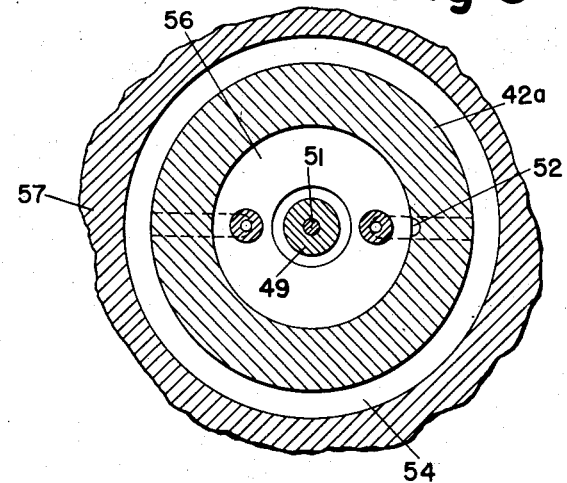
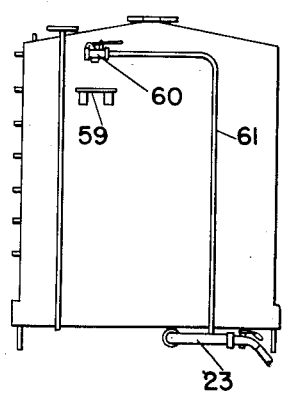
INVENTOR.
THOMAS JAMES, JR.
BY
*Woodcock and Phelan*
ATTORNEYS Patented Sept. 29, 1953

2,653,849

UNITED STATES PATENT OFFICE 2,653,849

AUXILIARY BRAKE CONTROL VALVE FOR RAILROAD CARS

Thomas James, Jr., Oaklyn, N. J.

Application June 11, 1949, Serial No. 98,508

5 Claims. (Cl. 303—68)

1

This invention relates generally to air brakes for railroad cars and it relates particularly to auxiliary control systems for such brakes. This application represents an improvement in the apparatus shown in my copending application for patent for Brake Control Mechanisms, Serial No. 776,020 filed September 25, 1947, now Patent No. 2,616,767 issued November 4, 1952.

Air brake systems for controlling railroad trains from a locomotive have been highly perfected and are in common use. No fully successful way has heretofore been found, however, to utilize the air brakes on moving cars or groups of cars that have been detached from the locomotive. Each car is provided with two reservoirs which are partially charged with compressed air when the locomotive is disconnected. At present this air can not be used for braking purposes except to maintain the brakes in set position to hold the car for a limited time in place where it is disconnected. If the detached car is moved, this supply of compressed air must all be released and wasted at considerable expense since, in addition to the cost of energy for compressing the air, much valuable time is lost in recharging the reservoirs when the car is again attached to a train. Furthermore, any further braking of the car must be done by hand.

An object of the invention is to provide an auxiliary brake cylinder control system for air brakes on railroad cars whereby the compressed air supply of a detached car may be conserved and utilized for braking purposes after the detached car has been moved. Any air that is not needed for braking will be retained to lessen the time required to replenish the supply when the car is again attached to a train.

A further object of the invention is to provide an auxiliary control system for railroad car air brakes that will render the air brakes useful when the car is to be moved after being detached from any locomotive or other source of compressed air without danger of impairing the normal operation of the air brake. Any substantial risk of accident or delay in the normal operation of a railroad train might outweigh the advantage of auxiliary control of detached cars. Such risks have been avoided in accordance with the present invention.

The invention is particularly applicable to, and needed in, car-classifying operations known as humping wherein cars or groups of cars are allowed to coast down an inclined network of tracks to be switched to a particular track to become part of a certain train. At present cars descend-

2 ing the incline are controlled by manually applied brakes, the brakes being set on a car as a result of the physical effort exerted on a brake by a rider. A further object of the invention is to enable one man to apply the brakes to any number of cars that may be humped in a group in contrast with the need of at least one man for each pair of cars for manual operation of the brakes. In accordance with the present invention, the brakes on all cars in a group are applied as a result of the release of air from the usual brake pipe at a service rate of reduction, or greater.

Before humping cars and in order to release the air brakes it has heretofore been necessary to bleed manually the air from the reservoir and brake cylinder of each car, an operation that is time consuming and laborious. In accordance with the invention the brake system is first charged to maximum and the AB valve then moves into pressure-release position to release the brakes. The compressed air stored in the air brake system can thereafter be used for braking purposes during the humping operation and afterward when the car forms part of a train. Therefore a further object of the invention is to provide an auxiliary brake cylinder control system whereby cars can not only be humped with a fully charged air brake system after the cars are disconnected from all air supplies but also the air may be conserved for subsequent use and there is eliminated the manual bleeding of either reservoirs or brake cylinders. This object is accomplished by interrupting, at the beginning of the humping operation, the flow of air between the AB control valve and the brake cylinders until such time as it is desired to apply the brakes.

Other objects and advantages of the invention will be apparent from the following description thereof with reference to the accompanying drawings, in which:

Fig. 2 is a sectional view taken along the line 2—2 of Fig. 1;

Fig. 3 is an enlarged sectional view taken along the line 3—3 in Fig. 1; and

Fig. 4 is a diagrammatic view of a railroad car useful in explaining the operation of the invention.

Figure 1:
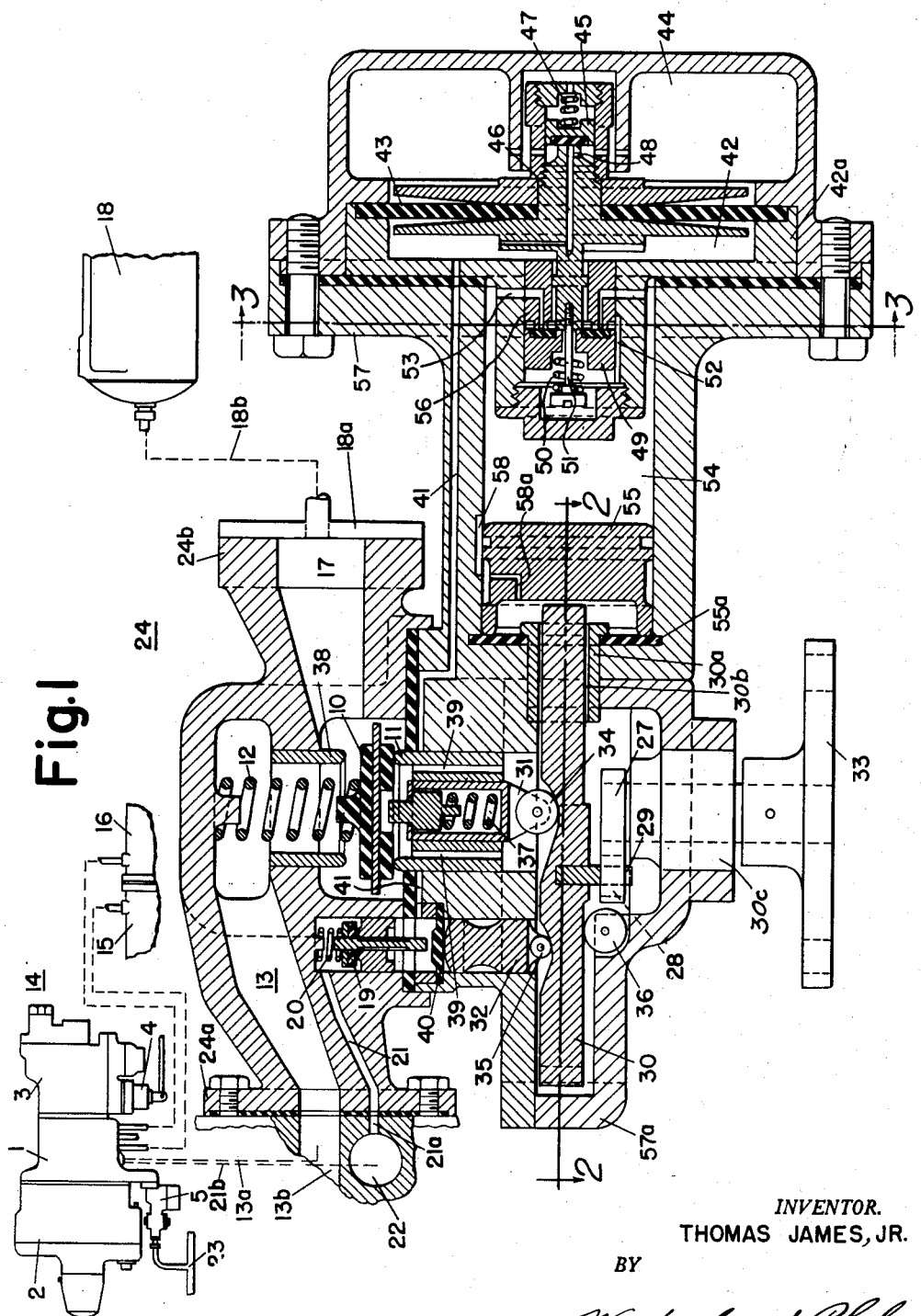
Fig. 1 is a longitudinal, vertical, sectional diagrammatic view of control apparatus embodying the invention.

In carrying out my invention in one form thereof, there is provided a brake cylinder control valve which eliminates the need of manual bleeding of the reservoirs or of the brake cylinder for the purpose of moving the cars over a hump. The brake cylinder auxiliary control valve when in normal position automatically disconnects communication between the air brake system and the auxiliary valve mechanism and discharges the air from the mechanism to atmosphere. When the brake cylinder auxiliary control valve is manually moved to abnormal position it establishes communications between the air brake system and the auxiliary valve mechanism, and disconnects or closes the communications between that valve mechanism and atmosphere. The brake cylinder auxiliary control valve can be manually and repeatedly moved between its normal position and its abnormal position without loss of air from the system repeatedly to apply and release the brakes. The brake cylinder auxiliary control valve is at all times automatically operable from its abnormal position to its normal position upon a reduction of brake pipe pressure at a service rate or at an emergency rate.

The air brakes can be applied at will to one or a large number of connected cars, in a group descending the hump, the control being by way of an operating valve located adjacent the hand brake wheel and affording positive actuation of the brakes to stop the cars as desired. More particularly, my brake cylinder auxiliary control valve is applicable, and has been applied to, existing standard braking equipment for railway cars, particularly of the type which includes the well-known and well-understood AB valve, the auxiliary and emergency reservoirs, the brake pipe line, and, of course, the brake cylinders.

Since the AB control valve for many years has been standard on American railroads, it has been shown at 14 by conventional outline in Fig. 1 with the pipe bracket thereof indicated at 1, the body 2 of the emergency portion being connected to the pipe bracket and, of course, the body 3 of the service portion also being connected to the pipe bracket 1. The reservoir bleed valve 4 extends from the body 3, while the brake pipe or pipe line 23 leads through a dust collector 5 to the pipe bracket 1. The flow connections to the pipe bracket 1 have been diagrammatically illustrated by broken lines, two of them respectively leading to the auxiliary reservoir 16 and the emergency reservoir 15, there being between the two an exhaust pipe connection. My brake cylinder auxiliary control valve 24 is connected by way of the fourth connection to the pipe bracket 1.

In accordance with my invention the auxiliary valve 24 has a flange 24a designed to be bolted directly to the AB pipe brackets, the flange 24a having passageways, one of which (the passageway 13) being connected directly to, as indicated by the broken line 13a of Fig. 1, the brake cylinder passageway 13b of the AB valve 14 and a connection from passageway 21 to a drilled opening 21a which I make in the AB pipe bracket 21b for communication with the brake pipe line 23, as by a passage 22 (known to those skilled in the art under the designation of the b-4 port or passage). The valve 24 is also provided with a flange 24b physically identical with the pipe flange (which was heretofore connected to the AB valve) for securement thereto of the flange 18a of the line 18b leading to the brake cylinder 18. These provisions mean a minimum of change in existing equipment, and yet bring to the equipment the new and desirable operations achieved in accordance with my invention.

The manner in which the new operations are accomplished will later be described in detail. It is desired at this time to emphasize the fact that with the valve 24 in the normal position illustrated in Fig. 1, there is direct communication through the passageway 13 between the AB valve 14 and the brake cylinder 18, in consequence of which the AB valve functions as heretofore in controlling the application and release of the brakes. It is to be further emphasized that the manual operation of the auxiliary valve 24 to the abnormal position cannot permanently affect the normal operation of the brakes. When a car connected to an engine, or other source of supply receives pressure therefrom, and thereafter there is a reduction of pressure calling for the application of brakes, there will be application of the same, since the auxiliary valve 24 is always and positively returned to its normal position whenever braking is called for as by, or as a result of, the brake-application reduction of brake pipe line pressure.

The foregoing advantages have been demonstrated in practical road service operation of a device built in accordance with my invention.

Referring now to Fig. 1, it will be observed that in its normal position valve element 10 is held against lower seat 11 by spring 12. Passageway 13, which communicates through control valve 14 (the AB valve) with reservoirs 15 and 16, in this position of valve 10 communicates directly and freely with passageway 17 and brake cylinder 18. Also in this position of valve 10, check valve 19 interposed between passageways 21 and 41 is positively closed by spring 20 to close passageway 21 with respect to passageway 41. Passageway 22 of AB control valve 14, connected to passageway 21, also connects with brake pipe 23. Thus with check valve 19 closed, its normal position, the auxiliary brake cylinder control valve 24 is isolated from the standard air brake equipment of the railroad car.

Referring to Fig. 2, pulling handle 25 or handle 26 rotates crank 27 which, through its slot 28, moves pin 29 affixed to cam 30 to the right thereby lifting cam followers 31 and 32, Fig. 1. To facilitate the manual movement of cam 30, which involves lifting followers 31 and 32 against considerable force, rollers 34 and 35 respectively are provided on these followers and roller 36 supports cam 30 from the opposite direction.

When follower 31 is lifted, spring 37 therein thrusts valve element 10 against seat 38 thereby closing completely passageway 13 and preventing any flow of air from reservoirs 15 or 16. This may be referred to, for convenience, as the abnormal position of valve element 10. Simultaneously the movement of valve element 10 from lower seat 11 releases all compressed air from brake cylinder 19 to the atmosphere through passageways 39 and around cam 30 disposed in a chamber in communication with the atmosphere by way of the opening 30c.

There has thus far been described apparatus for manually closing the air passage between the AB valve 14 and brake cylinder 18 to confine compressed air within storage reservoirs 15 and 16 and simultaneously releasing to the atmosphere air in brake cylinder 18. The reverse operation may also be performed manually, that is, handle 25 or handle 26 may be pushed to move cam 30 to its position shown in Fig. 1 thereby restoring valve element 10 to its normal position. However, it is desired that valve 10 shall automatically be restored to its normal position if inadvertently it should be left in abnormal position and this automatic restoration of valve element 10 to its normal position, under conditions to be described hereinafter, forms a useful step in the operation of the invention.

When valve element 10 is moved to its abnormal position, the following things are done preparatory to its automatic return to normal position. Lifting cam follower 32 thrusts diaphragm 40 upward thereby lifting check valve 19 and releasing to passageway 41 air from brake pipe 23 through passageways 21 and 22. It will be noted that diaphragm 40 prevents flow of air from the brake pipe to atmosphere with the auxiliary valve in abnormal position. With the auxiliary valve 24 in abnormal position, the cam follower 32 acting through diaphragm 40 lifts check valve 19 for flow of air between passageway 21 and passageway 41 leading to diaphragm chamber 42.

For reasons hereinafter described, it is desired that air shall pass freely from diaphragm chamber 42 to pressure chamber 44 but that it shall pass only slowly in the reverse direction. To this end, check valve 45 is provided at the end of passageway 46 so that air pressure in diaphragm chamber 42 in excess of that in pressure chamber 44 will move check valve 45 against the very light spring 47 to pass air freely to equalize these pressures. On the other hand, air passing from chamber 44 to chamber 42 must pass through orifice 48 which may be much smaller than passageway 46 thereby restricting the flow of air as desired.

When pressure in diaphragm chamber 42 is increased suddenly by manually lifting check valve 19, check valve 45 immediately opens and substantially equalizes the pressure on opposite sides of diaphragm 43 thus preventing damage to the diaphragm and quickly charging pressure chamber 44. If the pressure in chamber 42 decreases very slowly, as it may do due to leakage in the brake pipe, sufficient air will pass through orifice 48 to maintain substantially equal pressures on opposite sides of diaphragm 43, the diaphragm will not be deflected to the left to open check valve 49, and valve element 10 will not be disturbed. However, if the pressure in chamber 42 be reduced abruptly, diaphragm 43 will move to the left, as viewed in Fig. 1, thereby to restore valve element 10 to its normal position in the following way.

Check valve 49, normally closing passageway 53 by a force limited to that of spring 50, is moved to the right upon the sudden application of air to chamber 42. Air in chamber 42 can pass through passageway 52 to exert balanced forces on opposite sides of check valve 49. Then a slight reduction in pressure in chamber 42 below the pressure in chamber 44 causes diaphragm 43 to move to the left to thrust open check valve 49 and permit the air from chamber 42 to pass through passageway 53 to cylinder 54 to apply a substantial force to piston 55, moving the latter and cam 30 to the left to the position shown in Fig. 1 thereby restoring valve element 10 to its normal position and at the same time freeing check valve 19 for closure. The bushing 56 may be press fitted or otherwise secured in body 57.

As piston 55 moves to the left to the position shown in Fig. 1, exhaust port 58 is uncovered bypassing the piston and ultimately releasing to the atmosphere by way of clearance passage 30b and opening 30c all air stored in cylinder 54 thus restoring the apparatus to its initial position. However, passageway 58a is small in diameter so that pressure is maintained in cylinder 54 temporarily. It will be noted that the immediate closure of check valve 19 again isolates the auxiliary control valve from the AB valve 14.

As mentioned, automatically restoring valve 10 to its normal position upon a reduction in pressure in brake pipe 23, as would occur whenever the air brakes are applied in normal operation of a train, precludes the possibility of the apparatus causing trouble if, inadvertently, it should be left in its abnormal position when the car is connected to a train. Moreover, this automatic operation is useful as shown by the following example.

Suppose that pull-rod 25 or 26, Fig. 2, is manipulated to close valve element 10 upward before the car is humped, air being thereby released from brake cylinder 18 to permit the car to coast down an incline under gravity. Suppose, further, that a trainman riding on platform 59 desires to brake the car to a stop. He opens valve 60, Fig. 4, in pipe 61 leading to brake pipe 23 thereby releasing the pressure in brake pipe 23 and in chamber 42 causing diaphragm 43 to move to the left to release check valve 49 thereby actuating piston 55 to move cam 30 to restore valve element 10 to its normal position. Air from reservoir 15 and/or 16 may then pass through control valve 14 and passageways 13 and 17 to brake cylinder 18 for application of the brakes. It will be understood that during this humping operation the usual angle cocks close brake pipe 23 at the ends of the car.

After the trainman has applied the brakes by causing valve element 10 to open he may, if he so desires, produce an emergency application of the brakes by opening further valve 60 to release air more rapidly from brake pipe 23 thereby actuating valve 14 to apply air from emergency reservoir 15 to brake cylinder 18 in a well-known way.

It will be apparent that, if a group of cars having their brake pipes connected as usual between cars but closed at both ends of the group by the usual angle cocks, the one trainman on platform 59 may, by manipulating valve 60, control the application of brakes on all cars in the group.

Again assuming the car to be disconnected from an external source of pressure, it will now be apparent that after the diaphragm and pressure chambers 42 and 44 have been charged, the valve 24 may be manually moved between normal and abnormal positions repeatedly to apply and to release the brakes, since in the normal position of Fig. 1 there is application of a braking pressure to the brake cylinder 18, while in the abnormal position the supply of air to the brake cylinder 18 is interrupted and communication through passageway 17 and through and around the cam follower 41 to atmosphere is established. Such repeated operation is particularly useful for inspection purposes to ascertain the proper working of the brakes. For example, if it is suspected the brakes on a particular car of a train are not functioning properly, the angle cocks at the respective ends of the particular car may be closed (in effect isolating the car from the engine or other source of pressure) and the valve 24 manually moved to its abnormal position. This will release the brakes in manner already described. The manual return of the valve 24 to its normal position in Fig. 1 will apply the brakes. Thus, depending upon the results of the tests, decision can be immediately made as to whether the car should be removed from the train or whether it will be safe to continue movement of the train with that particular car included.

While only a preferred embodiment of the invention has been described, it will be understood that modifications thereof may be made within the spirit and scope of the invention as set forth in the appended claims.

What is claimed is:

1. In an air brake system for railroad cars wherein compressed air from a storage reservoir is applied to and subsequently released from a brake cylinder by an AB control valve in accordance with variations in pressure in a brake pipe line, the improvement which comprises an auxiliary valve connected between said AB control valve and said brake cylinder, said auxilary valve having an auxiliary valve element manually operable from a normal position to an abnormal position and having a passageway which in normal position of said auxiliary valve element interconnects said AB valve and said brake cylinder and in said abnormal position said element closes said passageway to interrupt flow of air between said AB valve and said brake cylinder and releases brake-applying pressure from said cylinder, said auxiliary valve having means including a pneumatic actuator for automatically returning said auxiliary valve element from its abnormal position to its normal position, control means for said pneumatic actuator comprising a diaphragm movable between predetermined positions for controlling application of pressure to said actuator, a passageway for flow of air from said brake pipe line when said auxiliary valve element is in its abnormal position for flow of air into a diaphragm chamber on one side of said diaphragm, a passageway from said diaphragm chamber to a pressure chamber on the opposite side of said diaphragm, said last named passageway including a first check valve which is opened by and upon application thereto of said brake pipe line pressure, said check valve including a spring for producing a pressure differential between said diaphragm chamber and said pressure chamber, said check valve closing upon attainment of said differential of pressure, said check valve having an associated passageway leading between said chambers and including a flow restriction therein whereby said pressure in said chambers are slowly equalized upon closure of said check valve by said spring, a reduction in pressure within said diaphragm chamber at a rate greater than established by said flow restriction as by a service rate reduction of pressure in said brake pipe line and in said diaphragm chamber for effecting movement of said diaphragm toward that chamber, a check valve opened by said diaphragm movement for application of pressure to said actuator for movement thereby of said auxiliary valve element from its abnormal position to its normal position for application of air pressure to the brake cylinder from said AB valve.

2. Means for controlling application of the air brakes of a car detached from sources of air supply, as from the engine, the car being provided with the usual components of an air brake system including at least one storage reservoir, a brake cylinder, a brake pipe line, a brake cylinder pipe and a control valve having a brake cylinder air passageway, comprising an auxiliary valve mechanism connected between said brake cylinder pipe and said brake cylinder air passageway of said control valve, said auxiliary valve mechanism having a communicating connection through said brake cylinder air passageway to said brake pipe line, said auxiliary valve mechanism having an auxiliary valve element manually operable from a normal to an abnormal position and having an auxiliary passageway which in said normal position interconnects said brake cylinder air passageway and said brake cylinder for application to and release from said brake cylinder of a brake-applying pressure, said auxiliary valve element in said abnormal position closing said auxiliary passageway to interrupt flow of air between said control valve and said brake cylinder and opening a passageway to connect said cylinder to atmosphere, means including a piston and cylinder for automatically returning said auxiliary valve element from its abnormal position to its normal position in response to application of air pressure to said piston, control means for controlling the application of air pressure to said piston comprising a diaphragm chamber, a pressure chamber, and a diaphragm disposed therebetween, a flow connection interconnecting said brake pipe line and said diaphragm chamber, a second valve element manually operable from a normal position to an abnormal position and closing said flow connection when in its normal position and opening the same when in its abnomal position for flow of air therethrough from said brake pipe line to said diaphragm chamber, walls forming a passageway extending through said diaphragm from said diaphragm chamber to said pressure chamber, said last-mentioned passageway including a first check valve operable against the bias of an opposing spring upon application of air pressure to said diaphragm chamber for building up pressure in said pressure chamber lower than that in said diaphragm chamber as determined by the tension in said spring, an additional flow connection between said diaphragm chamber and said pressure chamber always open and including a flow restriction through which pressures in said chambers tend slowly to equalize, a check valve chamber, a flow connection between said diaphragm chamber and said check valve chamber, a second check valve in said check valve chamber physically connected to said diaphragm for actuation thereby, said last-mentioned flow connection being always open to apply to opposite sides of said second check valve the air pressure of said diaphragm chamber, the walls of said check valve chamber having a passageway closable by said second check valve and connected to said diaphragm chamber and leading to said piston whereby a sudden reduction in air pressure in said diaphragm chamber results in movement of said diaphragm to open said second check valve to apply said air pressure to said piston, and manually operable means for reducing the air pressure in said brake pipe with said auxiliary valve element in said abnormal position for reducing said air pressure in said diaphragm chamber at a predetermined rate great enough to effect said movement of said diaphragm to actuate said piston to restore said auxiliary valve element to said normal position, said additional flow connection and said restriction therein slowly equalizing a difference between the pressures in said diaphragm chamber and in said pressure chamber to preclude said movement of said diaphragm upon a reduction of air pressure in said brake pipe at a rate no greater than established by said restriction and less than said predetermined rate whereby normal leakage of air from said brake pipe will not in itself result in restoration of said auxiliary valve element to said normal position.

3. The combination set forth in claim 2 in which said cylinder has a port arranged to be uncovered by said piston as it completes its said restoring movement of said auxiliary valve element to its normal position to connect said cylinder to atmosphere to minimize opposition to manual movement of said auxiliary valve element from said normal position to said abnormal position, said port comprising a flow restriction for gradual reduction of said air pressure in said cylinder to prevent application of a high differential pressure upon said diaphragm.

4. The combination set forth in claim 2 in which said manually operable elements each has associated therewith a cam follower, resilient means respectively biasing said elements to their respective normal positions, a cam disposed in operative engagement with said cam followers and movable from a normal position to an abnormal position to operate said elements against the bias of said resilient means to their respective abnormal positions, said piston being disposed to move said cam from its abnormal position to its normal position upon application of said air pressure thereto.

5. In an air brake system for railroad cars wherein compressed air from a storage reservoir is applied to and subsequently released from a brake cylinder by an AB control valve in accordance with variations in pressure in a brake pipe line, the improvement which comprises an auxiliary valve connected between said AB control valve and said brake cylinder, said auxiliary valve having an element manually operable from a normal position to an abnormal position and having a passageway which in normal position of said auxiliary valve element interconnects said AB valve and said brake cylinder and in said abnormal position said element closes said passageway to interrupt flow of air between said AB valve and said brake cylinder and releases brake-applying pressure from said cylinder, a control passageway for flow of air from said brake pipe line, a valve disposed in said control passageway having an element in a normal position closing said passageway and upon movement to an abnormal position opening said control passageway, a cam follower disposed in operative relation with respect to each of said valve elements for respectively moving them from their normal positions to their abnormal positions, a cam manually movable from a first position to a second position for actuating said cam followers, resilient means associated with said valve element for returning them upon return movement of said cam from their abnormal positions to their normal positions, a pneumatic actuator operatively associated with said cam for moving it from its second position to its first position, control means for said actuator comprising a diaphragm movable between predetermined positions for controlling application of pressure to said actuator, said control passageway being connected to a diaphragm chamber on one side of said diaphragm for flow of air into said chamber upon movement of said second-mentioned valve element to its abnormal position, a passageway from said diaphragm chamber to a pressure chamber on the opposite side of said diaphragm, said last-named passageway including a first check valve which is opened by and upon application thereto of said brake pipe line pressure, said check valve including a spring for producing a pressure differential between said diaphragm chamber and said pressure chamber, said check valve closing upon attainment of said differential of pressure, said auxiliary valve having an associated passageway leading between said chambers and including a flow restriction therein whereby said pressures in said chambers are slowly equalized upon closure of said check valve by said spring, a reduction in pressure within said diaphragm chamber at a rate greater than established by said flow restriction as by a service rate reduction of pressure in said brake pipe line and in said diaphragm chamber for effecting movement of said diaphragm toward that chamber, a check valve opened by said diaphragm movement for application of pressure to said actuator for movement thereby of said auxiliary valve element from its abnormal position to its normal position for application of air pressure to the brake cylinder from said AB valve and said storage reservoir.

THOMAS JAMES, Jr.

References Cited in the file of this patent

UNITED STATES PATENTS

| Number | Name | Date |
|---|---|---|
| 568,714 | Bills | Sept. 29, 1896 |
| 1,464,640 | Breck et al. | Aug. 14, 1923 |
| 2,361,134 | Stewart | Oct. 24, 1944 |